(12) United States Patent
Mueller et al.

(10) Patent No.: US 6,493,827 B1
(45) Date of Patent: Dec. 10, 2002

(54) METHOD AND SYSTEM FOR MONITORING CONFIGURATION CHANGES IN A DATA PROCESSING SYSTEM

(75) Inventors: Mark Wayne Mueller, Austin, TX (US); Peter Matthew Thomsen, Austin, TX (US); Wallace Tuten, Georgetown, TX (US); Lucinda Mae Walter, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/271,231

(22) Filed: Mar. 17, 1999

(51) Int. Cl.[7] .................................................. G06F 1/26
(52) U.S. Cl. ...................................... 713/300; 713/340
(58) Field of Search .............................. 713/300, 320, 713/324, 340, 1, 2, 100; 710/8, 10, 15–19

(56) References Cited

U.S. PATENT DOCUMENTS

| | | | | |
|---|---|---|---|---|
| 5,386,567 A | * | 1/1995 | Lien et al. | 713/100 |
| 5,691,607 A | * | 12/1997 | Dunstan et al. | 713/340 |
| 5,894,579 A | * | 4/1999 | Fujihara | 713/324 |
| 5,935,252 A | * | 8/1999 | Berglund et al. | 713/300 |
| 5,964,879 A | * | 10/1999 | Dunstan et al. | 713/340 |
| 6,055,647 A | * | 4/2000 | Lacombe et al. | 714/14 |

* cited by examiner

Primary Examiner—Peter Wong
Assistant Examiner—X. Chung-Trans
(74) Attorney, Agent, or Firm—Bracewell & Patterson LLP (57) ABSTRACT

A method and system for monitoring and adapting to configuration changes in a data processing system having a known configuration, while power is applied thereto. In response to a configuration change in the data processing system, values are calculated for multiple system operating factors. An alert is provided to a user if at least one of said calculated values, among the multiple system operating factors, is not within a predetermined range of values for the multiple system operating factors. In addition, the operation of the data processing system is restricted to accommodate for any system operating factors which are not within the predetermined range of values, such that the data processing system is guarded from damage due to an unstable configuration.

24 Claims, 7 Drawing Sheets

METHOD AND SYSTEM FOR MONITORING CONFIGURATION CHANGES IN A DATA PROCESSING SYSTEM

BACKGROUND OF THE INVENTION

1. Field of the Invention

The present invention relates in general to a method and system for data processing and in particular to a data processing system and method for monitoring a data processing system. Still more particularly, the present invention relates to a data processing system and method for monitoring and adapting to configuration changes in a data processing system while power is applied thereto.

2. Description of the Related Art

Data processing systems are typically designed such that components may be added to or removed from the data processing system to provide interchangeability of parts and the ability to upgrade to more suitable components. Typically, however, a computer must be powered down in order to change the component configuration of the data processing system. Upon the next power up, the system will detect any configuration changes and update the configuration by which the data processing system operates.

Components of a data processing system are typically either supply components or demand components. Each demand component is typically designed to require a specific range of voltage in order to function. A voltage regulator module is typically utilized to regulate the supply of voltage to a demand component.

Preferably, data processing systems are designed to assume that the user will desire accessibility to change the configuration of particular components of a data processing system. For example, a user may desire accessibility to add or remove a mouse, keyboard, printer, modem, and other hardware devices without having to access the inner shell of the data processing system. Therefore, connectors are provided about the outside of the data processing system shell which are hardwired to a system bus in order to aid the user in simple configuration changes. Typically, a particular voltage supply is regulated for each connector such that any component designed to utilize a particular connector must be designed for the particular voltage.

Other components are not as easily reconfigured as those with outer shell connectors. For example, slots are typically provided within the shell of a data processing system to allow a user to add components such as memory, processors and fans. However, each of these components demand particular voltages to properly function which are not always preconfigured in a data processing system. Therefore, in addition, the user may add voltage regulator modules (VRMs) which are specified to supply the voltage required by the added demand component.

Some components, termed "hot-plug" components, are designed to be added or removed from a data processing system while the system is powered up in order to change the configuration of the system. Hot-plug components allow previously static portions of the configuration within a data processing system to be interchanged without rebooting the system.

In data processing systems which act as servers, it is particularly desirable that the configuration be volatile such that the user is able to utilize hot-plug components to alter the configuration of components within the inner shell of the data processing system while power is supplied to the data processing system. For example, it is desirable that components including, but not limited to, memory, microprocessors, fans and VRMs be hot-plug elements supported by a data processing system. In designing hot-plug components such as memory, microprocessors, fans and VRMs to be supported by a data processing system, however, the system must be able to adapt to changes in the system configuration without degrading the system. In adapting to changes in a configuration, it is crucial that the data processing system have the ability to detect hot plug components when added or removed and balance component demands with the available supply of resources.

In a server environment, it would be particularly desirable that components within the inner shell adapt to any changes in the configuration of components. For example, it would be particularly desirable that if a fan fails, the power previously applied to the failed fan would be diverted to the remaining functioning fans such that those fans may provide greater cooling. In addition, it would be particularly desirable to alert a system operator when a memory supply is being overutilized and where that system operator may install additional memory without powering down or degrading the server.

As should thus be apparent, a configuration management controller is needed that facilitates the data processing system to adapt to configuration changes and monitors the use of system resources such that a user is alerted if resources are being overutilized and restricts the use of such resources. In particular such a controller needs to manage resources when configuration changes are made during operation through hot-plugging components.

SUMMARY OF THE INVENTION

It is therefore one object of the present invention to provide an improved method and system for data processing.

It is another object of the present invention to provide an improved data processing system and method for monitoring a data processing system.

It is yet another object of the present invention to provide a data processing system and method for monitoring and adapting to configuration changes in a data processing system while power is applied thereto.

The foregoing objects are achieved as is now described. A method and system for monitoring and adapting to configuration changes in a data processing system having a known configuration, while power is applied thereto, is provided. In response to a configuration change in the data processing system, values are calculated for multiple system operating factors. An alert is provided to a user if at least one of said calculated values, among the multiple system operating factors, is not within a predetermined range of values for the multiple system operating factors. In addition, the operation of the data processing system is restricted to accommodate for any system operating factors which are not within the predetermined range of values, such that the data processing system is guarded from damage due to an unstable configuration.

DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
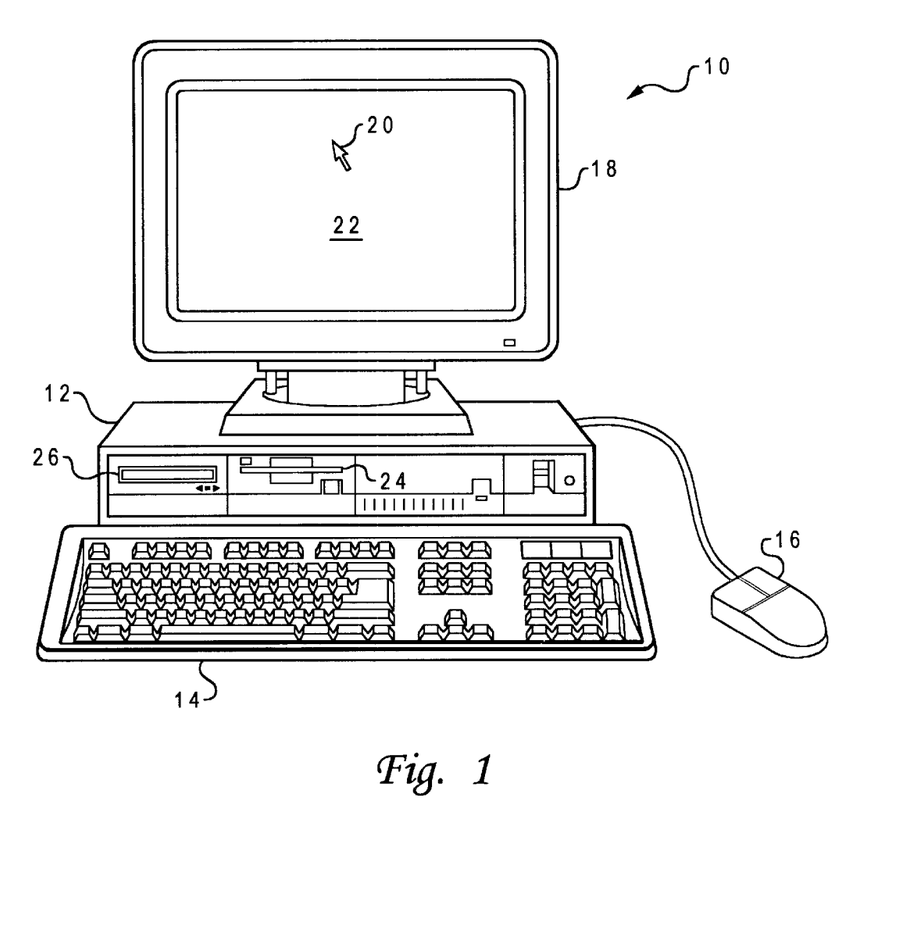
FIG. 1 depicts an illustrative embodiment of a data processing system that may be utilized to implement the present invention.

Referring now to the figures and in particular with reference to FIG. 1, there is illustrated a diagram of a representative hardware environment of a data processing system 10 such as a personal computer which utilizes an operating system. Data processing system 10 comprises processor unit 12, keyboard 14, mouse 16, and video display (or monitor) 18. Keyboard 14 and mouse 16 constitute user input devices, and video display 18 constitutes an user output device. Mouse 16 is a graphical pointing device utilized to control cursor 20, or graphical pointer, displayed on display screen 22 of video display 18. Those skilled in the art will recognize that other graphical pointing devices, such as a graphics tablet, joystick, trackball, or trackpad may also be utilized. To support storage and retrieval of data, processor unit 12 further comprises a floppy disk drive 24 and a compact disk drive 26 which are interconnected with other components of processor unit 12 in a well-known manner. Of course, those skilled in the art are aware that additional conventional components can also be connected to processor unit 12.

Data processing system 10 supports a Graphical User Interface (GUI) which allows a user to "point-and-click" by moving cursor 20 to an icon or specific location on screen 22 via mouse 16 and then depressing one of the buttons on mouse 16 in order to perform a user command. Upon depressing one of the buttons on mouse 16, a switch associated with the depressed button is closed which sends a selection signal to data processing system 10

Figure 2:
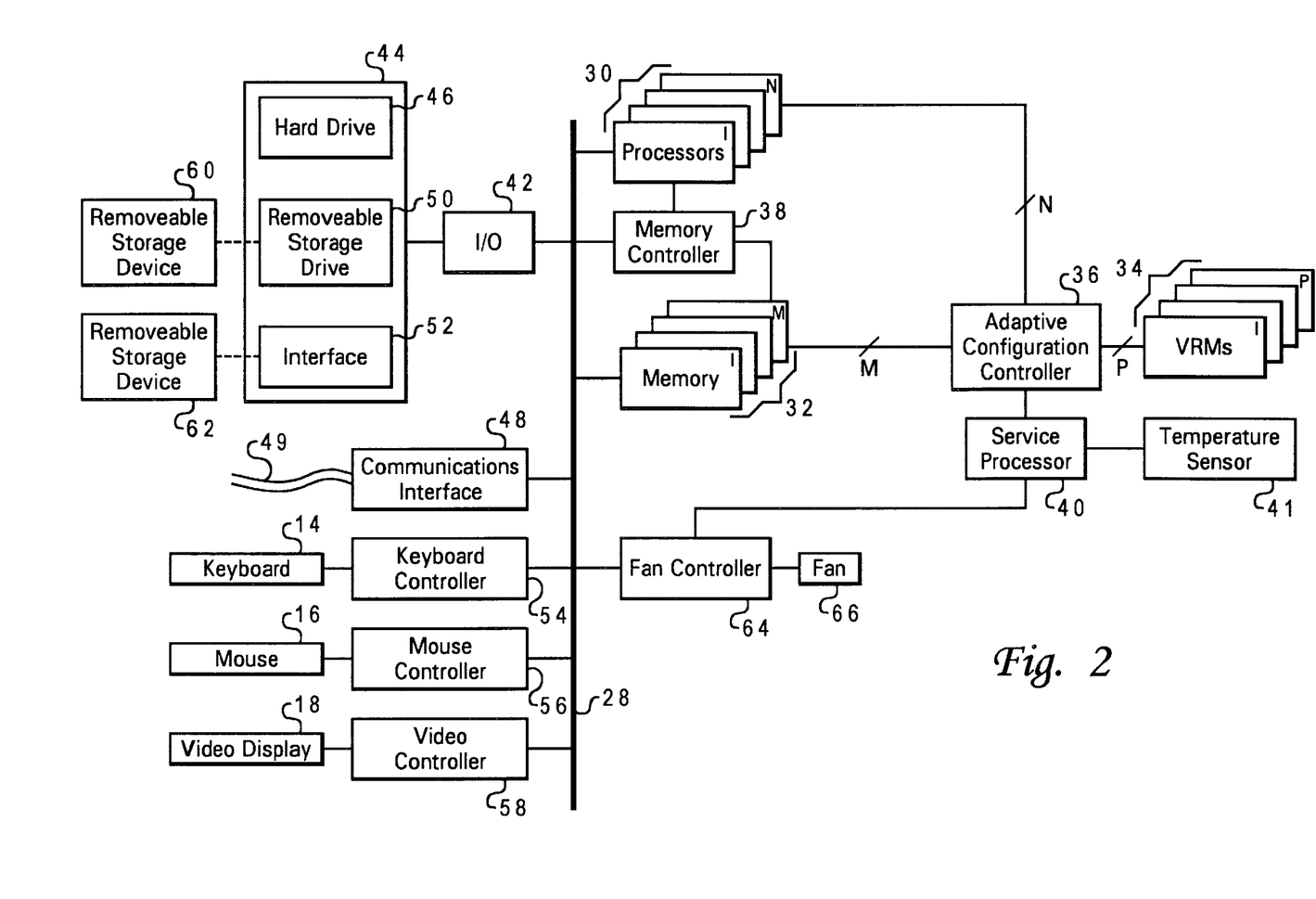
FIG. 2 illustrates a more detailed block diagram representation of the processing unit of the data processing system depicted in FIG. 1.

With reference now to the figures and in particular with reference to FIG. 2, there is depicted a data processing system environment for implementing the present invention. The environment is a data processing system 10 that includes N processors 30. N processors 30 are connected to a system bus 28. N processors 30 may be arranged in a SMP architecture, NUMA architecture, or other known multiprocessor architectures. After reading the description, it will be apparent to a person skilled in the relevant art how to implement the invention using other data processing systems and/or data processing system architectures.

Data processing system 10 also includes M memory elements 32, which preferably include random access memory (RAM). Multiple routines are typically stored in ROM where each routine typically contains multiple processor steps. As will be appreciated by those skilled in the art, memory 32 comprises a number of individual volatile memory modules which store segments of operational system, application software and other data while power is supplied to data processing system 10.

A secondary memory 44 may also be included in data processing system 10. Secondary memory 44 includes, for example, a hard disk drive 46, a removable storage drive 50, and an interface 52. Removable storage drive 50 may represent a floppy disk drive, magnetic tape drive, an optical disc drive, or other data drive which reads and writes to a removable storage device 60. Removable storage device 60 represents a floppy disk, magnetic tape, optical disk, or any other data storage device which is read by and written to by removable storage drive 50. As will be appreciated by one skilled in the art, removable storage device 60 includes a computer usable storage medium having stored therein computer software and/or data.

In alternative embodiments, secondary memory 44 may include other similar means for allowing computer programs, or other instructions to be loaded into data processing system 10. Such means may include, for example, a removable storage device 62 and interface 52. Examples may include a program cartridge and cartridge interface, a removable chip (such as EEPROM, PROM, or PCMCIA) and associated socket, and other removable storage devices 62 and interfaces 52 which allow software and data to be transferred from removable storage device 62 to data processing system 10.

Interactions between components of secondary memory 44 are controlled by I/O controller 42 connected to system bus 28. In addition, memory controller 38 controls all Direct Memory Access (DMA) operations through I/O controller 42, such as paging data between memory 32 and hard disk drive 46.

Data processing system 10 may also include a communications interface 48. Communications interface 48 allows software and data to be transferred between data processing system 10 and external devices via communications path 49. Examples of communications interface 48 include a modem, printer, communications port, and other communications supporting hardware. Software and data transferred via communications interface 48 are in the form of signals that can be electronic, electromagnetic, optical, or other signals capable of being received or sent by communications interface 48 via communications path 49. In particular, communications interface 48 provides a means by which data processing system 10 may interface a network such as a LAN or the Internet.

A service processor 40 is also included within data processing system 10. In particular, service processor 40 controls the diagnostic management of data processing system 10. Preferably, service processor 40 is an integrated subsystem solution independent of the hardware and operating system, complementing the hardware by monitoring, logging events and reporting on operating conditions within data processing system 10. The service processor provides alerts to a user in case of problems with system operating factors within data processing system 10. For example, service processor 10 may shut down components in the event of an unstable system configuration or temperatures exceeding a predetermined high temperature threshold. More particularly, if all fans have failed within data processing system 10, an alert would be provided to the user that the system must be power down or risk damage due to high temperatures before they are reached. In the event that the user does not power down, the service processor would automatically power down data processing system 10. Typically, service processor 40 is implemented in servers and other large data processing systems, however may also be implemented within a workstation or laptop computer.

Adaptive configuration controller 36 is preferably a field programmable gate array (FPGA) which receives inputs from N processors 30, M memory elements 32, P voltage regulator modules (VRMs) 34 and service processor 40. In addition, adaptive configuration controller 36 may receive inputs from other components within a data processing system. Adaptive configuration controller may be incorporated within an FPGA which already receives these and other inputs for performing alternate functions. Any of these elements may be a hot plug element. Adaptive configuration controller 36 receives a trigger event each time a configuration change in data processing system 10 is made called a presence detect signal. Each slot or bay in data processing system 10 which houses an element includes an unique presence detect signal which changes states if an element is added to or removed from a slot or bay. While adaptive configuration controller 36 is shown implemented within an FPGA, in other embodiments, adaptive configuration controller 36 may be implemented within an application specific integrated circuit (ASIC).

As will be further described in greater detail, adaptive configuration controller 36 supports service processor 40 by monitoring system operating factors such as the utilization of resources, particularly power resources, within data processing system 10 and alerting service processor 40 when surplus power resources are available and when insufficient resources are available. Service processor 40 may utilize alerts from adaptive configuration controller 36 to alert the operating system to alert the user of problems in order to guard against damage to data processing system 10 from an unstable configuration. In combination with service processor 40, adaptive configuration controller 36 increases the reliability, availability and serviceability of data processing system 10.

Service processor also utilizes diagnostic measurement devices. For example, at least one temperature sensor 41 is included to detect the temperature of particular elements within data processing system 10 and/or the ambient temperature within data processing system 10. In addition, data processing system 10 typically includes temperature reduction means such as fan controller 64. Fan controller 64 controls the operation of fan 66 and may also control the operation of additional fans. In addition, heat sinks (not shown) and other thermal reduction means may be incorporated within data processing system 10.

The present invention is preferably implemented using software and hardware executing in a data processing system environment similar to that described above with respect to FIG. 2. Thus, the term "computer program product" is used to generally refer to a program stored at removable storage drive 50 or the hard disk installed in hard disk drive 46. These computer program products are means for providing software to data processing system 10.

Computer programs or computer control logic are stored in memory 32 and/or secondary memory 44. In addition, computer programs are embedded within service processor 40. In other embodiments, computer programs may be stored in service memory (not shown) associated with service processor 40. Computer programs can also be received via communications interface 48. Such computer programs, when executed, enable data processing system 10 to perform the features of the present invention as discussed herein. In particular, the computer programs, when executed, enable service processor 40 to perform the features of the present invention. Accordingly, such computer programs represent controllers of data processing system 10.

To complete the description of data processing system 10, there are three additional input/output (I/O) controllers, namely, keyboard controller 54, mouse controller 56 and video controller 58, all of which are connected to system bus 28. As their names imply, keyboard controller 54 provides the hardware interface for keyboard 14, mouse controller 56 provides the hardware interface for mouse 16, and video controller 58 provides the hardware interface for video display 18. FIGS. 1 and 2 represent a typical server according to the present invention but may vary for a specific application.

Figure 3:
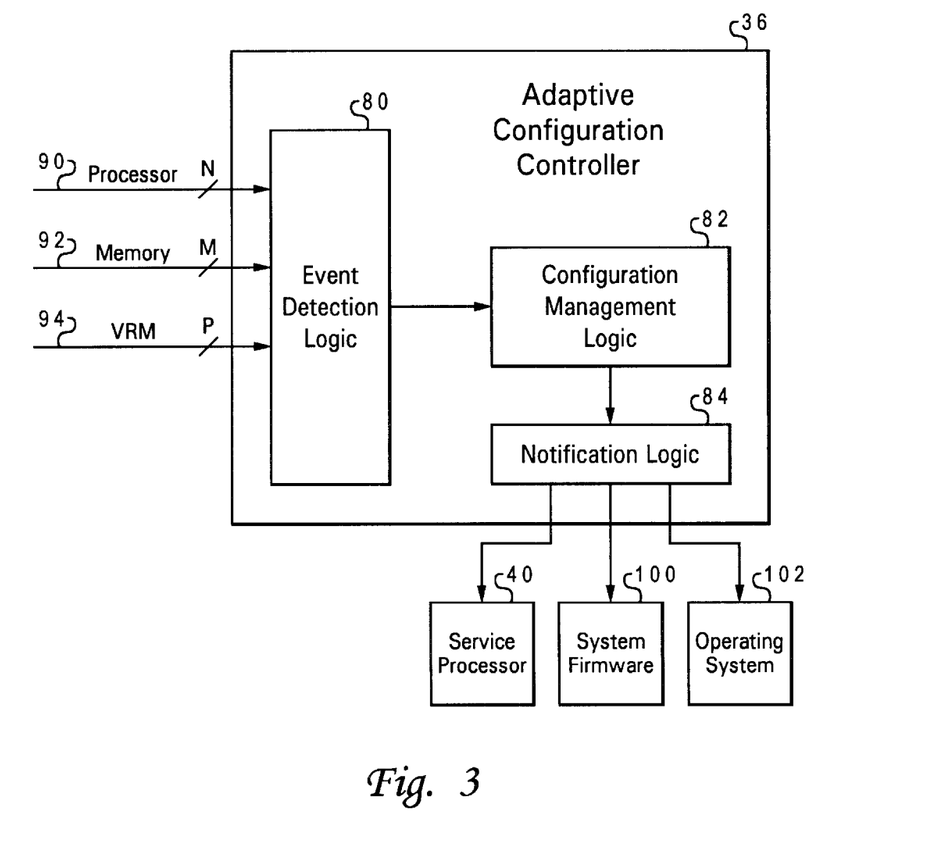
FIG. 3 depicts a block diagram of an adaptive configuration controller within a data processing system illustrated in FIG. 2.

Referring now to FIG. 3, there is illustrated a more detailed block diagram of adaptive configuration controller 36. Multiple inputs may be designated to adaptive configuration controller 36. In the present example, inputs are designated as a processor input 90 with N inputs, a memory input 92 with M inputs, a VRM input 94 with P inputs. Each input is directed to event detection logic 80. Event detection logic 80 is activated by a presence detect signal when a configuration change is made. A configuration change may occur when at least one element is added, removed, or fails. Event detection logic 80 transmits a detection signal to configuration management logic 82. Configuration management logic 82 processes the detection signal to recalculate the resources available and utilized by is data processing system 10. Finally, a signal is sent to notification logic 84 which controls the transmission of interrupt signals to a service processor 40, system firmware 100 and/or an operating system 102 if the difference between supply elements and demand elements exceeds a set threshold. In the present embodiment, the service processor is particularly designated to handle notifications from adaptive configuration controller 36. However, in other embodiments, it may be preferable for system firmware 100 and/or operating system 102 to handle notifications from adaptive configuration controller.

Figure 4:
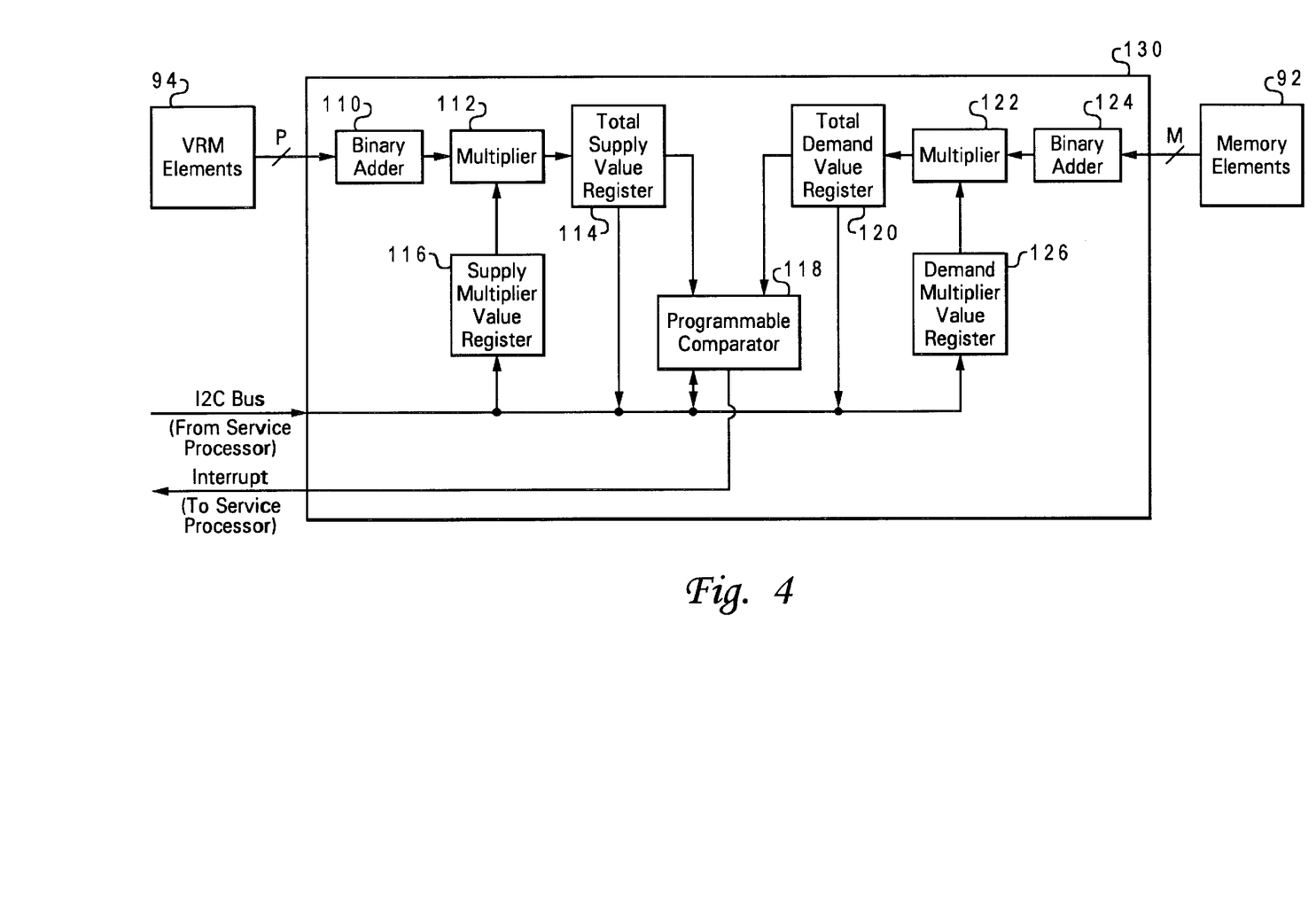
FIG. 4 illustrates a more detailed block diagram of a hardware logic resource within the adaptive configuration controller depicted in FIG. 3.

With reference now to FIG. 4, there is illustrated a block diagram of a hardware logic resource incorporated within an adaptive configuration controller utilized to compare supply with demand for a particular voltage. Logic resource 130 depicts the supply/demand relationship for P VRM elements 94 and M memory elements 92 at 3.3 V. In the example, it is expected that each memory element within M memory elements 92 will demand the same current and each VRM within P VRM elements 94 will supply the same current. However, in alternate examples, the logic resources may be modified to allow for memory elements within M memory elements 92 to demand different current amounts. Event detection logic, configuration management logic and notification logic as illustrated in FIG. 3 are incorporated within logic resource 130.

Referring still to FIG. 4, the number of VRM elements 92 is detected by binary adder 110 which supplies a binary count value of the number P of supply elements provided. A supply multiplier value register 116 contains a value representative of the current supply expected for each VRM element. Multiplier 112 multiplies the binary count value with the supply multiplier value and stores the value in a total supply value register 114. The total supply value is representative of the total current resources available at a particular voltage.

The number of memory elements 92 is detected by binary adder 124 which supplies a binary count value of the number M of demand elements provided. A demand multiplier value register 126 contains a value representative of the current supply demanded for each memory element. Multiplier 122 multiplies the binary count value with the demand multiplier value and stored the value in a total demand value register 120. The total demand value is representative of the total current demands for the M memory elements 92.

A programmable comparator 118 compares the total supply value with the total demand value and determines if the difference is greater than a threshold supplied by the service processor. For example, the total demand value may exceed the total supply value by 5%. If the difference is greater than an acceptable threshold sent to programmable comparator 118 from the service processor, an interrupt is sent to the service processor. In addition, interrupts and other data may be sent from programmable comparator 118 to the system firmware or operation system. Depending on the size of the difference between the total supply value and total demand value, the service processor may trigger different events. For example, if the total demand value exceeds the total supply value by more than 5%, the service processor would alert the user of risks associated with the difference, request that the user close all applications and shut down the system or make changes in the configuration. If the total demand value exceeds the total supply value by more than 10%, the service processor would alert the user of an automatic shutdown and thereafter power down the data processing system.

Figure 5:
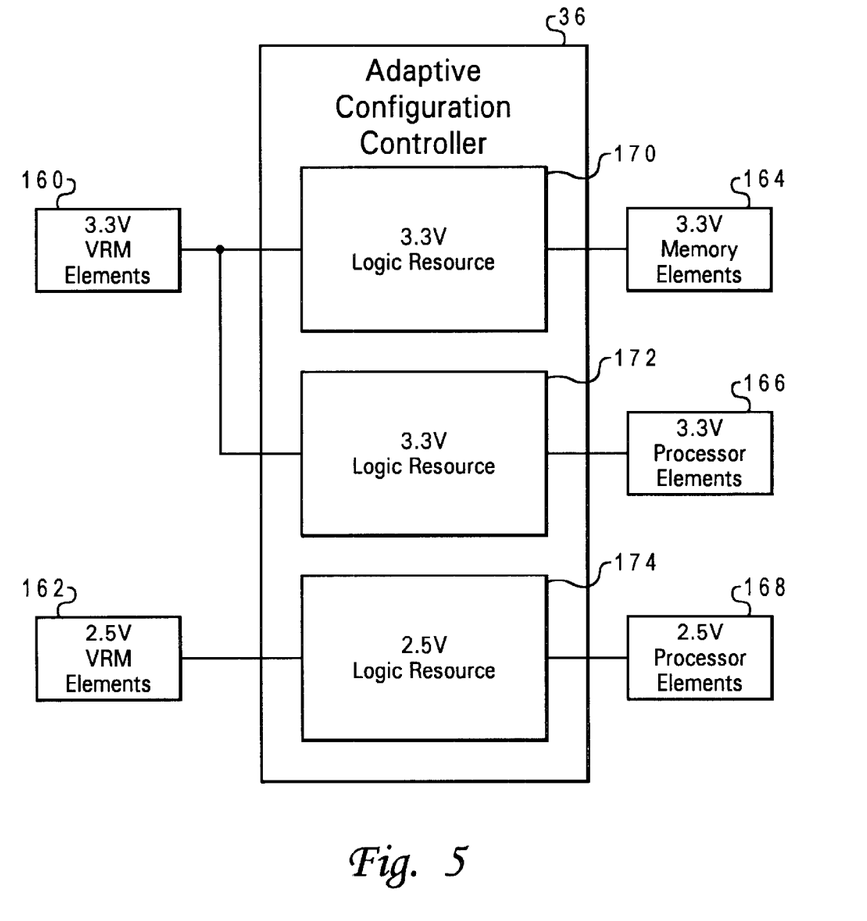
FIG. 5 illustrates a more detailed block diagram of multiple logic resources within the adaptive configuration controller depicted in FIG. 3.

Referring now to FIG. 5, there is illustrated a block diagram of multiple logic resources incorporated within an adaptive configuration controller utilized to compare supply with demand for particular voltages. Each logic resource is constructed similarly to logic resource 130 of FIG. 4 and is designated with a particular voltage supply. Each element, within each group of elements, input to a logic resource, is expected to supply or pull an amount of current equal to the other elements in the group. However, in alternate embodiments, different elements within a group of elements may supply/demand a unique amount of current per element.

The available VRMs are further classified by a voltage supplied. In the example, two sets of VRMs are supplied: 3.3V VRM elements 160 and 2.5V VRM elements 162. 3.3V VRM elements 160 supply voltage and current to 3.3V logic resources 170 and 172. 3.3V memory elements 164 and 3.3V processor elements 166 both draw upon the supply from 3.3V VRM elements 160. The current demanded by each memory element of 3.3V memory elements 164 may be less than the current demanded by each processor of 3.3V processor elements 166. Therefore, the service processor adjusts the expected current supplied to the supply multiplier value registers of logic resources 170 and 172 by a percentage to divide the resources among both logic resources.

Further incorporated within adaptive configuration controller 36, the supply provided by 2.5V VRM elements 162 to 2.5V processor elements 168 is detected by 2.5V logic resource 174. The logic resources illustrated in FIG. 5 are for purposes of example. Any multiple of logic resources may be incorporated within adaptive configuration controller 36 in order to detect the utilization of resources within a data processing system.

Figure 6:
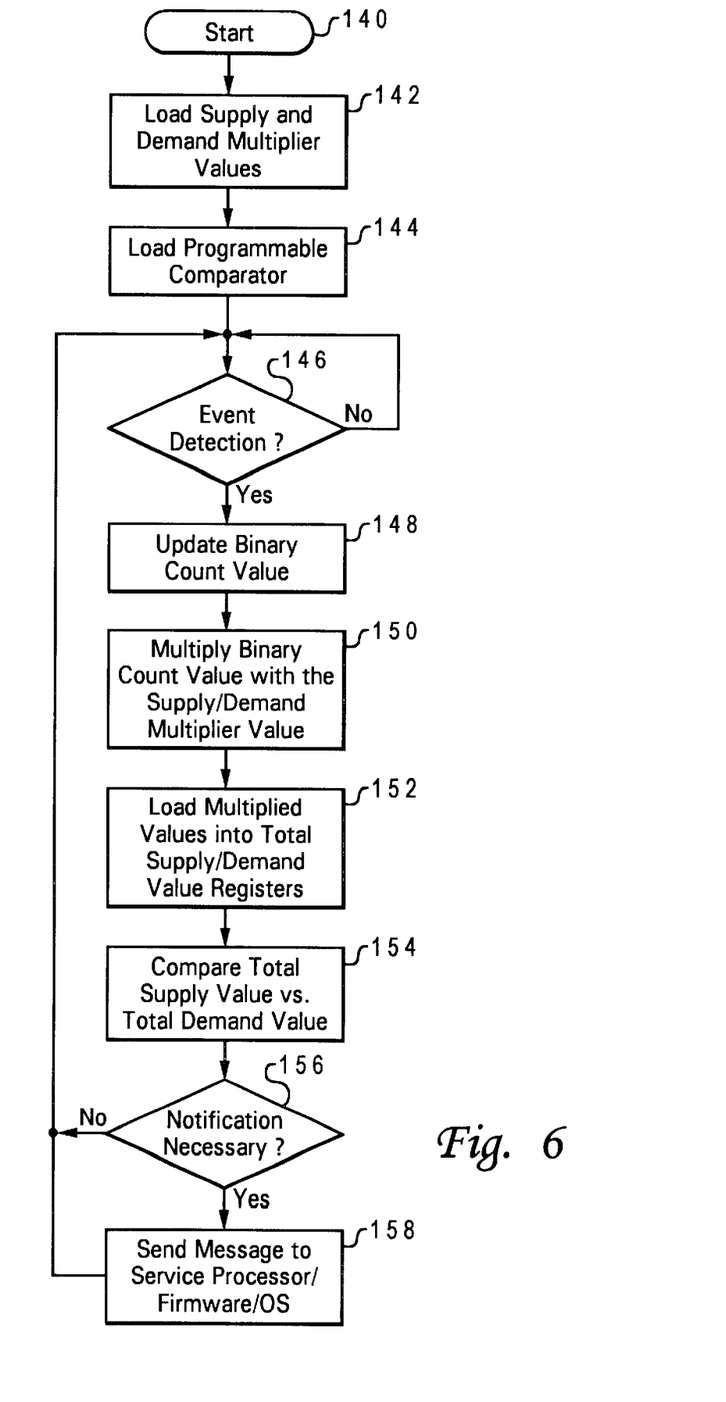
FIG. 6 is a high level logic flowchart illustrating a process executed by an adaptive configuration controller in accordance with the present invention.

With reference now to FIG. 6, there is depicted a logic flowchart which illustrates the method of the present invention. It should be appreciated by those skilled in the art that FIG. 6 represents a self-consistent sequence of steps leading to a desired result. The steps are those requiring physical manipulation of physical quantities. Usually, although not necessarily, these quantities take the form of electrical or magnetic signals capable of being stored, transferred, combined, compared and otherwise manipulated. It has proven convenient at times by those skilled in the art to refer to these signals as bits, values, elements, symbols, characters, terms, numbers or the like. It should be born in mind, however, that all of these and similar terms are to be associated with the appropriate physical quantities and are merely convenient labels applied to those quantities.

Further, the manipulations performed are often referred to as terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data processing systems such as servers or other similar devices. In all cases the distinction between the method operations and operating a computer and the method of computation itself should be born in mind. The present invention relates to method steps for operating an FPGA such as adaptive configuration controller 36 of FIG. 2, in processing electrical or other physical signals to generate desired physical signals. As illustrated, the process described in FIG. 6 begins at block 140 and thereafter passes to block 142. The process may be initiated each time power is applied to the data processing system, or may occur while power is already applied to the data processing system.

Block 142 depicts the loading of supply and demand multiplier values from the service processor. For each logic resource, expected current values, or a ratio thereof, are provided by the service processor as supply and demand multiplier values. Thereafter, the process passes to block 144. Block 144 illustrates the loading of threshold values into the programmable comparator. Again, each logic resource receives particular thresholds from the service processor above which the service processor should be notified. The process including block 142 and block 144 provides an initialization for the adaptive configuration controller.

Block 146 illustrates the determination of whether or not an event has been detected. If not, the process iterates at block 146 until an event is detected. When an event is detected, the process passes to block 148. Block 148 depicts the updating of binary count values. Each binary count value is recalculated to determine the number of elements which are detected after the configuration change. Thereafter, the process passes to block 150. Block 150 illustrates the multiplication of the binary count value with the supply/demand multiplier values. Next, the process proceeds to block 152. Block 152 depicts the loading of multiplied values into the total supply/demand registers. Thereafter, the process passes to block 154. Block 154 illustrates the comparison of the total supply value with the total demand value. Next, the process passes to block 156.

Block 156 depicts the determination of whether or not notification is necessary. If not, the process proceeds to block 146. In response to a difference between the total supply value and total demand value exceeding a threshold, notification is necessary and the process passes to block 158. Block 158 illustrates the sending of a message to the service processor, firmware, and/or operating system (OS). The message is typically an interrupt to the service processor including the amount by which the threshold is exceeded.

Figure 7:
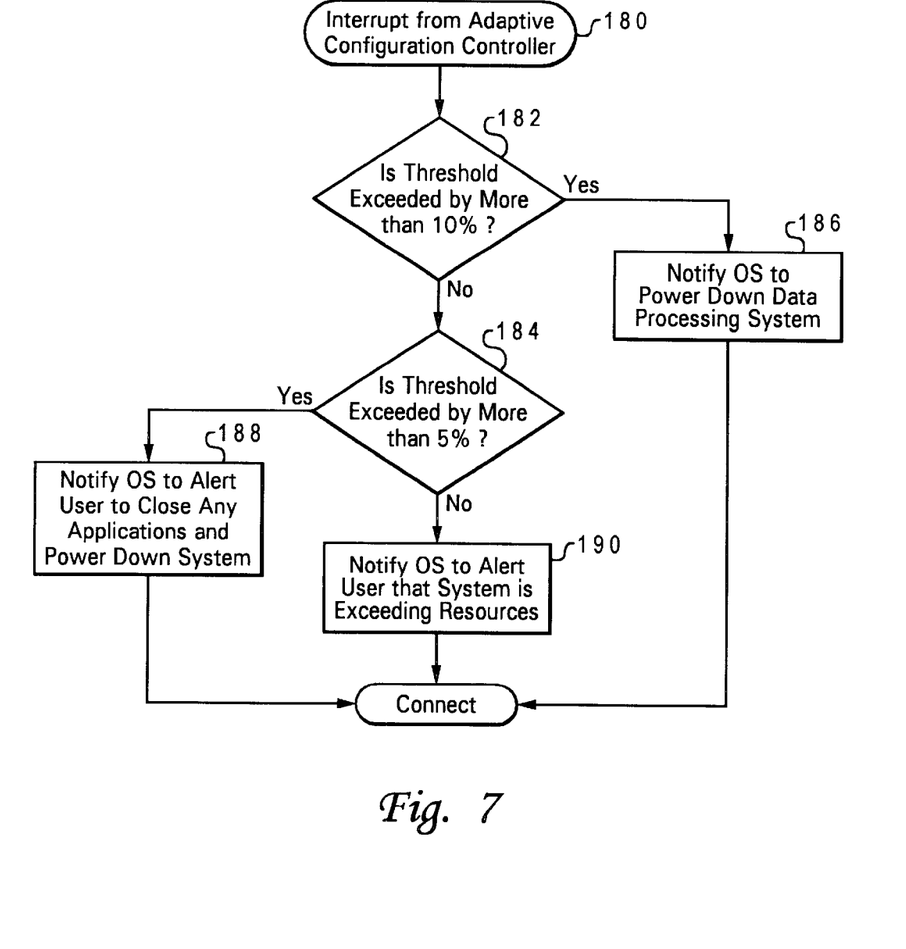
FIG. 7 is a high level logic flowchart depicting a process executed by a service processor in accordance with the present invention.

With reference now to FIG. 7, there is illustrated a high level logic flowchart depicting a process executed by a service processor associated with an adaptive configuration controller in accordance with the present invention. The process begins at block 180 when an interrupt from the adaptive configuration controller is received at the service processor. The service processor utilizes the threshold data calculated by the service processor to determine how to restrict the operation of the data processing system to guard the data processing system against damage due to an unstable configuration. By utilizing the adaptive configuration controller to make high speed calculations, the service processor can make decisions about configuration changes without having to perform the calculations within the service processor. The service processor is not limited to the process depicted and includes additional processes for monitoring and controlling the data processing system.

Block 182 depicts a determination of whether or not the threshold is exceeded by more than 10%. If so, the process proceeds to block 186. Block 186 illustrates the notification to the operating system to power down the data processing system whereafter the process returns. If the threshold is exceeded by less than 10%, the process passes to block 184. Block 184 depicts the determination of whether or not the threshold is exceeded by more than 5%. If so, the process passes to block 188. Block 188 illustrates notification to the operating system to alert a user to close any applications and power down the data processing So system before damage occurs. If the threshold is not exceeded by more than 5%, the process passes to block 190. Block 190 depicts notification to the operation system to alert a user that the system is exceeding resources.

While the invention has been particularly shown and described with reference to a preferred embodiment, it will be understood by those skilled in the art that various changes in form and detail may be made therein without departing from the spirit and scope of the invention.

What is claimed is:

1. A method of monitoring configuration changes in a data processing system, having a known configuration, while power is applied thereto, said method comprising the steps of:
   in response to a configuration change in a data processing system, calculating values for a plurality of system operating factors including:
      updating a demand binary counter value containing the number of components which demand power for operation;
      updating a supply binary counter value containing the number of components which supply power;
      calculating a total demand value by multiplying said demand binary counter value with a value representing the current expected to be utilized by each said component which demands power for operation, where said total demand value is said power necessary for said plurality of components; and
      calculating a total supply value by multiplying said supply binary counter value with a value representing the current supply by each said component which supply power for operation, where said total supply value is the available power;
   providing an alert to a user if at least one of said calculated values among said plurality of system operating factors is not within a predetermined range of values for said plurality of system operating factors; and
   restricting operation of said data processing system to accommodate for any said system operating factors which are not within said predetermined range of values, such that said data processing system is guarded from damage due to an unstable configuration.

2. The method of monitoring configuration changes in a data processing system according to claim 1, said step of calculating a total demand value further comprises the step of:
   calculating the power necessary for each processor within said data processing system.

3. The method of monitoring configuration changes in a data processing system according to claim 1, said step of calculating a total demand value fiber comprising the step of:
   calculating the power necessary for each memory element within said data processing system.

4. The method of monitoring configuration changes in a data processing system according to claim 1, said step of providing an alert to a user if at least one of said calculated values among said plurality of system operating factors is not within a predetermined range of values for said plurality of system operating factors further comprising the step of:
   alerting said user if the power necessary for each of said plurality of components exceeds the available power of said data processing system.

5. The method of monitoring configuration changes in a data processing system according to claim 4, said step of alerting said user if the power necessary for each of said plurality of components exceeds the available power of said data processing system further comprising the steps of:
   detecting each of a plurality of components within said data processing system which supplies power;
   calculating said available power supplied by each of said plurality of components within said data processing system which supplies power; and
   comparing said available power with said power necessary for each of said plurality of components.
   notifying a system manager if said power necessary for each of said plurality of components exceeds said available power where said system manager notifies said user.

6. The method of monitoring configuration changes in a data processing system according to claim 5, said step of calculating said available power supplied by each of said plurality of components within said data processing system which supplies power, further comprising the step of:
   calculating said available power supplied by each of a plurality of voltage regulator modules within said data processing system.

7. The method of monitoring configuration changes in a data processing system according to claim 1, said step of restricting operation of said data processing system to accommodate for any said system operating factors which are not within said predetermined range of values further comprising the step of:
   powering down said data processing system if the power necessary for each of said plurality of components exceeds the available power of said data processing system by a predetermined amount.

8. A system for monitoring configuration changes in a data processing system, having a known configuration, while power is applied thereto, said system comprising:
   means for calculating values for a plurality of system operating factors in response to a configuration change in a data processing system including:
      means for updating a demand binary counter value containing the number of components which demand power for operation;

means for updating a supply binary counter value containing the number of components which supply power;

means for calculating a total demand value by multiplying said demand binary counter value with a value representing the current expected to be utilized by each said component which demands power for operation, where said total demand value is said power necessary for e aid plurality of components; and means for calculating a total supply value by multiplying said supply binary counter value with a value representing the current supply by each said component which supply power for operation, where said total supply value is the available power;

means for providing an alert to a user if at least one of said calculated values among said plurality of system operating factors is not within a predetermined range of values for said plurality of system operating factors; and means for restricting operation of said data processing system to accommodate for any said system operating factors which are not within said predetermined range of values, such that said data processing system is guarded from damage due to an unstable configuration.

9. The system for monitoring configuration changes in a data processing system according to claim 8, said means for calculating values for a plurality of system operating factors and said means for providing an alert to a user if at least one of said calculated values among said plurality of system operating factors is not within a predetermined range of values for said plurality of system operating factors comprising an adaptive configuration controller.

10. The system for monitoring configuration changes in a data processing system according to claim 8, said means for calculating a total demand value further comprising:

means for calculating the power necessary for each processor within said data processing system.

11. The system for monitoring configuration changes in a data processing system according to claim 8, said means for calculating a total demand value further comprising:

means for calculating the power necessary for each memory element within said data processing system.

12. The system for monitoring configuration changes in a data processing system according to claim 8, said means for providing an alert to a user if at least one of said calculated values among said plurality of system operating factors is not within a predetermined range of values for said plurality of system operating factors further comprising:

means for alerting said user if the power necessary for each of said plurality of components exceeds The available power of said data processing system.

13. The system for monitoring configuration changes in a data processing system according to claim 12, said means for alerting said user if the power necessary for each of said plurality of components exceeds the available power of said data processing system further comprising:

means for detecting each of a plurality of components within said data processing system which supplies power.

means for calculating said available power supplied by each of said plurality of components within said data processing system which supplies power;

means for comparing said available power with said power necessary for each of said plurality of components; and means for noting a system manager if said power necessary for each of said plurality of components exceeds said available power where said system manager notifies said user.

14. The system for monitoring configuration changes in a data processing system according to claim 13, said means for calculating said available power supplied by each of said plurality of components within said data processing system which supplies power, further comprising:

means for calculating said available power supplied by each of a plurality of voltage regulator modules within said data processing system.

15. The system for monitoring configuration changes in a data processing system according to claim 8, said means for restricting operation of said data processing system to accommodate for any said system operating factors which are not within said predetermined range of values further comprising;

means for powering down said data processing system if the power necessary for each of said plurality of components exceeds the available power of said data processing system by a predetermined amount.

16. The system for monitoring configuration changes in a data processing system according to claim 8, said means for calculating values for a plurality of system operating factors in response to a configuration change in a data processing system wherein said configuration change comprises the insertion of a hot plug component.

17. The system for monitoring configuration changes in a data processing system according to claim 8, said means for calculating values for a plurality of system operating factors in response to a configuration change in a data processing system wherein said configuration change comprises de removal of a hot plug component.

18. A program product for monitoring configuration changes in a data processing system, having a known configuration, while power is applied thereto, said program product comprising:

a data processing system usable medium; and an adaptive configuration controller encoded within said data processing system usable medium that, in response to a configuration change in a data processing system:

calculates values for a plurality of system operating factors including:

updating a demand binary counter value containing the number of components which demand power for operation;

updating a supply binary counter value containing the number of components which supply power;

calculating a total demand value by multiplying said demand binary counter value with a value representing the current expected to be utilized by each said component which demands power for operation, where said total demand value is said power necessary for said plurality of components; and calculating a total supply value by multiplying said supply binary counter value with a value representing the current supply by each said component which supply power for operation, where said total supply value is the available power;

provides an alert to a user if at least one of said calculated values among said plurality of system operating factors is not within a predetermined range of values for said plurality of system operating factors; and restricts operation of said data processing system to accommodate for any said system operating factors which are not within said predetermined range of values.

19. The program product according to claim 18, wherein said adaptive configuration controller:
   calculates the power necessary for each processor within said data processing system.

20. The program product according to claim 18, wherein said adaptive configuration controller:
   calculates the power necessary for each memory element within said data processing system.

21. The program product according to claim 18, wherein said adaptive configuration controller:
   alerts said use if the power necessary for each of said plurality of components exceeds the available power of said data processing system.

22. The program product according to claim 21, wherein said adaptive configuration controller:
   detects each of a plurality of components within said data processing system which supplies power;
   calculates said available power supplied by each of said plurality of components within said data processing system which supplies power, and
   compares said available power with said power necessary for each of said plurality of components.
   notifies a system manager if said power necessary for each of said plurality of components exceeds said available power where said system manager notifies said user.

23. The program product according to claim 21, wherein said adaptive configuration controller:
   calculates said available power supplied by each of a plurality of voltage regulator modules within said data processing system.

24. The program product according to claim 18, wherein said adaptive configuration controller:
   powers down said data processing system if the power necessary for each of said plurality of components exceeds the available power of said data processing stem by a predetermined amount.

* * * * *